(12) United States Patent
Howard et al.

(10) Patent No.: US 10,891,003 B2
(45) Date of Patent: Jan. 12, 2021

(54) SYSTEM, METHOD, AND APPARATUS FOR AN INTERACTIVE CONTAINER

(71) Applicant: Omni Consumer Products, LLC, Dallas, TX (US)

(72) Inventors: Stephen Howard, Dallas, TX (US); Larry McNutt, Carrollton, TX (US)

(73) Assignee: Omni Consumer Products, LLC, Addison, TX (US)

( * ) Notice: Subject to any disclaimer, the term of this patent is extended or adjusted under 35 U.S.C. 154(b) by 0 days.

(21) Appl. No.: 15/394,799

(22) Filed: Dec. 29, 2016

(65) Prior Publication Data

US 2017/0185228 A1    Jun. 29, 2017

Related U.S. Application Data

(63) Continuation-in-part of application No. 15/258,973, filed on Sep. 7, 2016, now abandoned, which is a
(Continued)

(51) Int. Cl.
| | |
|---|---|
| *G06F 3/00* | (2006.01) |
| *G06F 3/0482* | (2013.01) |
| *G06K 9/00* | (2006.01) |
| *G06F 3/041* | (2006.01) |
| *G06F 3/042* | (2006.01) |
| *H04N 13/204* | (2018.01) |
| *H04N 5/225* | (2006.01) |

(Continued)

(52) U.S. Cl.
CPC ............ *G06F 3/0418* (2013.01); *G06F 3/017* (2013.01); *G06F 3/0425* (2013.01); *G06F 3/0482* (2013.01); *G06F 3/04886* (2013.01); *G06K 9/00288* (2013.01); *G06K 9/00355* (2013.01); *G06K 9/209* (2013.01); *H04N 5/2251* (2013.01); *H04N 5/232* (2013.01); *H04N 13/204* (2018.05); *G06F 2203/04101* (2013.01); *G06F 2203/04108* (2013.01)

(58) Field of Classification Search
CPC ............................. G06F 3/0418; G06F 3/0425
USPC ........................................................ 345/419
See application file for complete search history.

(56) References Cited

U.S. PATENT DOCUMENTS

| | | |
|---|---|---|
| 4,843,410 A | 6/1989 | Kallenberg |
| 5,528,263 A | 6/1996 | Platzker et al. |

(Continued)

FOREIGN PATENT DOCUMENTS

| | | |
|---|---|---|
| EP | 2210532 A2 | 7/2010 |
| EP | 2397932 A1 | 12/2011 |

OTHER PUBLICATIONS

International Search Report and Written Opinion of the International Searching Authority received in Patent Cooperation Treaty Application No. PCT/US2015/068192, dated May 20, 2016, 11 pages.

*Primary Examiner* — Hai Tao Sun
(74) *Attorney, Agent, or Firm* — Foley & Lardner LLP

(57) ABSTRACT

An interactive container creation method, apparatus and system. The method includes creating a list, deploying the list to at least one device, calibrating and identifying touch areas, identifying at least one of an asset and a shape to be defined as a touch area, identifying the x,y axis of each point for a predetermined number of points for each of the at least one of asset or shape, and creating a touch area based of the identified x,y axis.

14 Claims, 6 Drawing Sheets

Related U.S. Application Data continuation-in-part of application No. 14/535,823, filed on Nov. 7, 2014, now Pat. No. 9,465,488, which is a continuation-in-part of application No. 13/890,709, filed on May 9, 2013, now Pat. No. 9,360,888, application No. 15/394,799, which is a continuation-in-part of application No. 14/985,044, filed on Dec. 30, 2015, which is a continuation-in-part of application No. PCT/US2015/068192, filed on Dec. 30, 2015.

(60) Provisional application No. 62/311,354, filed on Mar. 21, 2016, provisional application No. 62/373,272, filed on Aug. 10, 2016.

(51) Int. Cl.
    *G06F 3/0488*     (2013.01)
    *G06K 9/20*     (2006.01)
    *G06F 3/01*     (2006.01)
    *H04N 5/232*     (2006.01)

(56) References Cited

U.S. PATENT DOCUMENTS

| | | |
|---|---|---|
| 5,933,132 A | 8/1999 | Marshall et al. |
| 6,031,519 A | 2/2000 | O'Brien |
| 6,339,748 B1 | 1/2002 | Hiramatsu |
| 6,512,536 B1 | 1/2003 | Ross |
| 6,759,979 B2 | 7/2004 | Vashisth et al. |
| 7,034,807 B2 | 4/2006 | Maggioni |
| 7,046,838 B1 | 5/2006 | Sakagawa et al. |
| 7,084,857 B2 | 8/2006 | Lieberman et al. |
| RE40,368 E | 6/2008 | Amon |
| 7,598,942 B2 | 10/2009 | Underkoffler et al. |
| 8,094,129 B2 | 1/2012 | Izadi et al. |
| 8,331,998 B2 | 12/2012 | Baratono et al. |
| 2002/0083140 A1* | 6/2002 | Shin ................ G06Q 30/02 709/206 |
| 2003/0120611 A1 | 6/2003 | Yoshino et al. |
| 2006/0004280 A1 | 1/2006 | Kotake et al. |
| 2006/0249679 A1 | 11/2006 | Johnson et al. |
| 2007/0217042 A1 | 9/2007 | Kweon |
| 2008/0029691 A1 | 2/2008 | Han |
| 2009/0114786 A1 | 5/2009 | Meyer et al. |
| 2009/0153652 A1* | 6/2009 | Barenbrug ......... H04N 13/0018 348/54 |
| 2010/0066694 A1* | 3/2010 | Jonsdottir ............. G06F 3/0236 345/173 |
| 2010/0302138 A1 | 12/2010 | Poot et al. |
| 2010/0321379 A1* | 12/2010 | Kang ................ H04N 7/17318 345/419 |
| 2011/0170768 A1* | 7/2011 | Alldrin ................ G06K 9/4661 382/159 |
| 2011/0242103 A1 | 10/2011 | Han et al. |
| 2011/0292347 A1 | 12/2011 | Zhang et al. |
| 2012/0035934 A1* | 2/2012 | Cunningham ......... G06F 1/1639 704/260 |
| 2012/0044141 A1 | 2/2012 | Ueshima et al. |
| 2012/0113223 A1 | 5/2012 | Hilliges et al. |
| 2012/0162077 A1 | 6/2012 | Sze et al. |
| 2012/0212413 A1 | 8/2012 | Plagemann et al. |
| 2012/0262366 A1 | 10/2012 | Zhu et al. |
| 2012/0268372 A1 | 10/2012 | Park et al. |
| 2012/0299879 A1 | 11/2012 | Kim |
| 2012/0326958 A1 | 12/2012 | Deuel et al. |
| 2013/0006814 A1 | 1/2013 | Inoue et al. |
| 2013/0127705 A1 | 5/2013 | Jung et al. |
| 2013/0194182 A1* | 8/2013 | Tarama ................. A63F 13/06 345/158 |
| 2013/0257748 A1* | 10/2013 | Ambrus ............ G02B 27/0093 345/173 |
| 2014/0253692 A1 | 9/2014 | Wilson et al. |
| 2014/0254880 A1 | 9/2014 | Srinivasan et al. |

* cited by examiner

SYSTEM, METHOD, AND APPARATUS FOR AN INTERACTIVE CONTAINER

CROSS REFERENCE TO RELATED APPLICATION

This application is a continuation-in-part of U.S. application Ser. No. 15/258,973, filed on Sep. 7, 2016, which is a continuation of U.S. application Ser. No. 14/535,823 filed Nov. 7, 2014, which is a continuation-in-part of U.S. application Ser. No. 13/890,709 filed May 9, 2013. This application is a continuation-in-part of U.S. application Ser. No. 14/985,044 and PCT Application No. PCT/US2015/068192 both filed on Dec. 30, 2015. This application claims priority to U.S. Provisional Applications 62/311,354 filed on Mar. 21, 2016 and 62/373,272 filed on Aug. 10, 2016. The above identified patent applications are incorporated herein by reference in their entirety to provide continuity of disclosure.

FIELD OF THE INVENTION

The disclosure relates to systems, apparatus and methods for creating and operating interactive containers. More specifically, this disclosure relates to creating and operating interactive containers that relate to any assets that are projected, printed, displayed, etc.

BACKGROUND OF THE INVENTION

It has become more common from assets of different origin or type to communicate and cause an activity based on such interaction. For example, it has become common for users to utilize their portable devices to control various products in their home and/or office made by different manufacturers. The selection of the assets and its interaction can be customizable and variable. Therefore, it is desirable to be able to simulate such interactions and to be able to customize it. In addition, some assets may be susceptible to tampering. Thus, it is beneficial to display an interactive image, printout, etc. of such assets. Therefore, there is a need for an improved system, apparatus and method for creating and operating interactive container(s).

SUMMARY OF THE INVENTION

Embodiments described herein relate to an interactive container creation method, apparatus and system. The method includes creating a list, deploying the list to at least one device, calibrating and identifying touch areas, identifying at least one of an asset and a shape to be defined as a touch area, identifying the x,y axis of each point for a predetermined number of points for each of the at least one of asset or shape, and creating a touch area based of the identified x,y axis.

BRIEF DESCRIPTION OF DRAWINGS

Reference will now be made to the following drawings.

DETAILED DESCRIPTION

Figure 1:
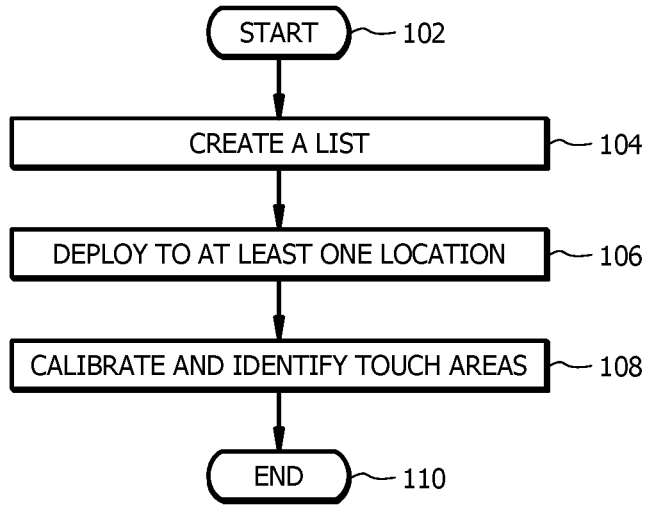
FIG. 1 is an embodiment illustrating a flow diagram of a method for creating at least one interactive container.

In the descriptions that follow, like parts are marked throughout the specification and drawings with the same numerals, respectively. The drawing figures are not necessarily drawn to scale and certain figures may be shown in exaggerated or generalized form in the interest of clarity and conciseness.

It will be appreciated by those skilled in the art that aspects of the present disclosure may be illustrated and described herein in any of a number of patentable classes or context including any new and useful process, machine, manufacture, or composition of matter, or any new and useful improvement thereof. Therefore, aspects of the present disclosure may be implemented entirely in hardware or combining software and hardware implementation that may all generally be referred to herein as a "circuit," "module," "component," or "system" (including firmware, resident software, micro-code, etc.). Further, aspects of the present disclosure may take the form of a computer program product embodied in one or more computer readable media having computer readable program code embodied thereon.

Any combination of one or more computer readable media may be utilized. The computer readable media may be a computer readable signal medium, any type of memory or a computer readable storage medium. For example, a computer readable storage medium may be, but not limited to, an electronic, magnetic, optical, electromagnetic, or semiconductor system, apparatus, or device, or any suitable combination of the foregoing. More specific examples of the computer readable storage medium would include, but are not limited to: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. Thus, a computer readable storage medium may be any tangible medium that can contain, or store a program for use by or in connection with an instruction execution system, apparatus, or device.

Computer program code for carrying out operations utilizing a processor for aspects of the present disclosure may be written in any combination of one or more programming languages, markup languages, style sheets and JavaScript libraries, including but not limited to Windows Presentation Foundation (WPF), HTML/CSS, XAML, and JQuery, C, Basic, *Ada, Python, C++, C #, Pascal, *Arduino. Additionally, operations can be carried out using any variety of compiler available.

Aspects of the present disclosure are described herein with reference to flowchart illustrations and/or block diagrams of methods, systems and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, processor, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, processor, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

FIG. 1 is an embodiment illustrating a flow diagram of a method 100 for creating at least one interactive container. The method 100 starts at step 102 and proceeds to step 104. At step 102, the method 100 creates a list. The list may contain images, assets, attributes, WISPSs, rules, menus, etc. A WISP in this application relates to a shell that defines the rules and the interaction between the assets and/or containers. In an embodiment, the creation of the list is performed at a remote location or on a cloud. In other embodiments, the creation of the list is performed on the same device operating the interaction between the assets, menus, and/or containers. In such embodiments, the deployment step would not be necessary.

At step 106, the method 100 deploys at least one list to a device that is operating the interaction between the assets, menus, and/or containers. In one embodiment, the deployment may occur on several devices that may or may not be at the same location. The device(s) may be at the same location as the container being operated. In one embodiment, the axis location, i.e. x, y, x, location of the assets may be incorporated into the list at the list creation time or it may be determined on the device controlling the interaction, i.e., a device located at the same location as the container. The device controlling the interaction may learn the location of the assets, it may display the assets, or it may scan for characteristics to learn their location. In one embodiment, a list may already exist and only changes, omissions and/or additions are deployed, rather than the entire list. Furthermore, the deployment may be initiated/conducted manually or it may be automatic.

At step 108, the method 100 calibrates assets subjects in the container and/or identifies the touch areas. During the calibration process, the method 100 may perform projection mapping for every container to ensure that the display matches the physical space. In one embodiment, the method 100 uses image training during calibration to detect a known image, item, logo, etc.

In other embodiments, a person manually calibrates the system by shifting from point to point identifying the touch area and triggering a new touch area when the current touch area is done and another touch area exists and needs to be identified by the system. Whereas, during an automatic calibration, the system automatically identifies a predetermined number of points per touch area relating to assets and/or shapes. In another embodiment, a calibration stream is cropped to where only areas of interest are calibrated. Only calibrating areas of interest results in a more accurate and more efficient calibration. The calibration process is better described in FIG. 2. Method 100 ends at step 110.

Figure 2:
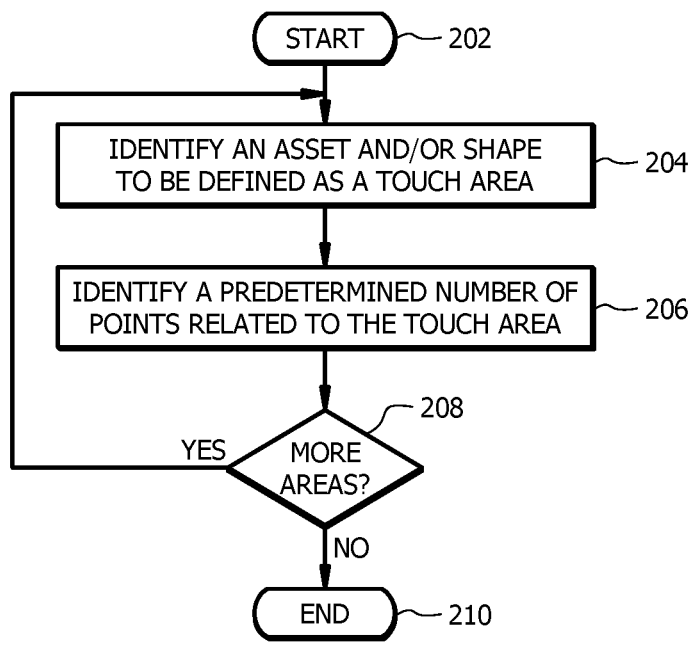
FIG. 2 is an embodiment illustrating a flow diagram of a method for calibrating at least one interactive container.

FIG. 2 is an embodiment illustrating a flow diagram of a method 200 for calibrating at least one interactive container. Method 200 starts at step 202 and proceeds to step 204, wherein the method 202 detects an asset or shape displayed that needs to be defined as a touch area. At step 206, the method 200 identifies a predetermined number of points relating to the asset or shape where each point is defined by its x, y axis. At step 208, the method 200 determines if there are more assets or shapes to be identified as touch areas. If there are more assets or shapes to be identified as touch areas, the method 200 returns to step 204. Otherwise, the method 200 ends at step 210.

For example, a projector displays a pre-determined shape over a touch area not identified yet. Using a camera, the method identifies the x, y axis for each point in a pre-determined number of points relating to the asset or displayed shape. Once the axis is identified, the method 200 proceeds to the next asset or shape in the container. The method 200 may perform such function on a single container or multiple containers. The method 200 may utilize asset identification, display recognition, shape recognition, light, exposure, contrast, RGB difference, infrared, etc. to determine the areas that need to be identified as touch areas. When all touch areas are identified, the camera and/or method are capable of identifying the touch areas and identify the corresponding rule, menu, activity etc. relating to the touch area.

Figure 3:
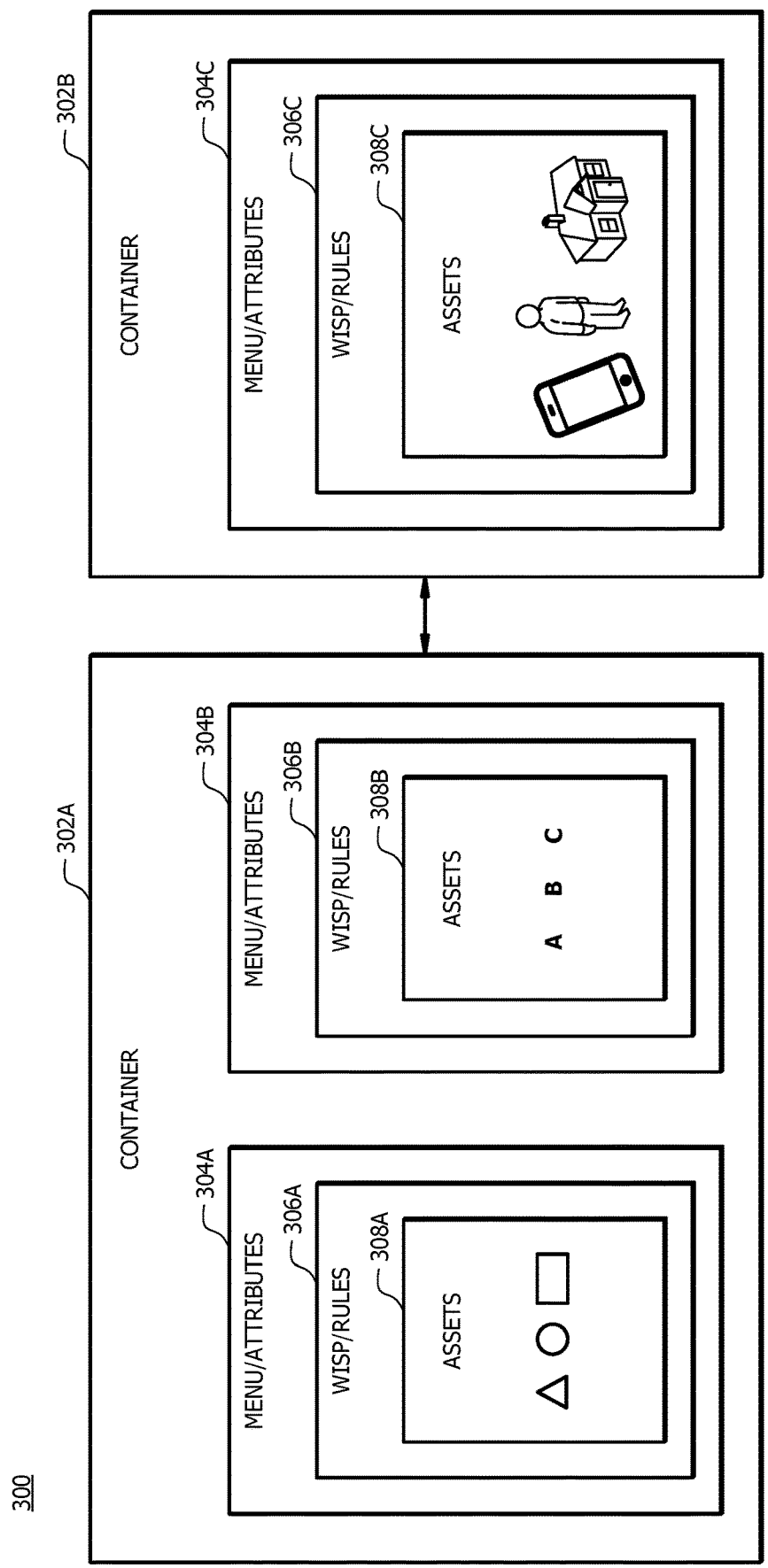
FIG. 3 is a block diagram illustrating an embodiment of an apparatus of interactive containers.

FIG. 3 is a block diagram illustrating an embodiment of an apparatus 300 of interactive containers. In this embodiment, the apparatus 300 has two containers 302A and 302B, where container 302 A has two menus/attributes 304A and 304B. Container 302B has a single menu/attributes 304C. Each of the menu/attribute's 304A, 304B and 304C has a WISP/Rules 306A, 306B and 306C, respectively. Each of the WISP/Rules 306A, 306B and 306C has assets 308A, 308B and 308C, respectively.

A single interactive apparatus 300 may include any number of containers that may or may not communicate and/or interact. As such, in one embodiment, interacting with one container may cause a change in another container. Containers create an interactive experience using the menus/attributes and WISP/rules relating to assets. The menu/attributes are options at an instance, which may be a default instance or options that come about due to an interaction or touch on or around a menu item or attribute presented. A container may contain any number of menus/attributes 306, which may interact or stand alone. Attributes may be audio, video, image, change in display, etc. WISP/rules are the interactive active mask over a touch area that triggers a menu or attribute due to a pre-determined activity. Assets may be pre-determined object or person, printouts of objects, displayed items, images, video, an identified object or person, and the like.

In one embodiment, a weighted average may be used. In such an embodiment, a new object/asset is added to a container. The weighted average method adds the object/asset incrementally over time where the accounting of the new item increases in percentile in relation to the whole picture over time. Such a method insures that the item is truly added, allows of real-time reaction to change in a container, and allows for a realistic change over time.

Figure 4:
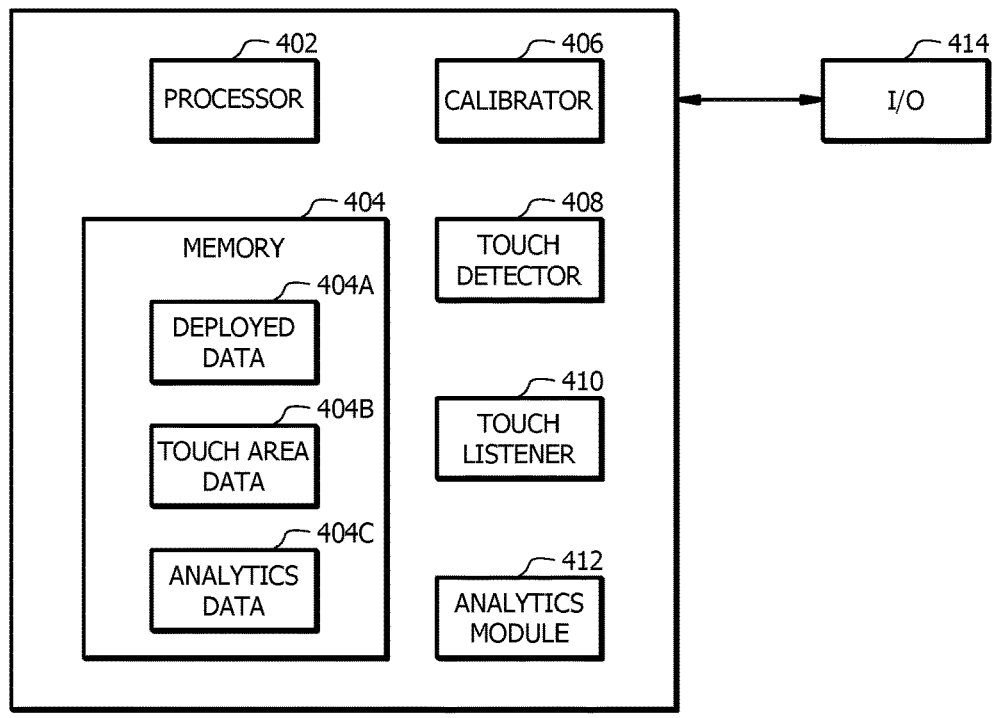
FIG. 4 is a block diagram illustrating an embodiment of an interactive system relating to at least one interactive container.

FIG. 4 is a block diagram illustrating an embodiment of an interactive system 400 relating to at least one interactive container. In this embodiment, the system 400 includes a processor 402, memory/storage medium 404, a calibrator 406, a touch detector 408, a touch listener 410, an analytics module 412 and an I/O 414. The memory 404 include deployed data 404A, touch area data 404B, analytics data 404C and the likes.

Even though all these items are shown to be in the same system 400, yet, they may be distributed in multiple systems that may or may not be in the same location. In one embodiment, a cloud may communicate with the systems 400 to deploy items from remote locations, such as, the deployed data 404A.

The touch detector 408 detects touch and its related information, which includes identifying coordinate related to a touch area. In one embodiment, the touch detector 408 may distinguish between a hover and a touch, where the distinction relates to the z axis of the touch. If the hand or object is closer to the object or further from a camera or system then it is a touch. If the hand or object is further from the object or closer to a camera or system then it is hover. In one embodiment, the touch detector may identify different types of touch based on thresholds, such as time, proximity, color of the object doing the touch, based on a sequence of touches, etc. The touch detection 408 may refine the recognition of a touch by performing the method of FIG. 5, which will be described herein below. In another embodiment, the touch detector may crop areas to where only areas of interest are detected, resulting in a touch detection that is more accurate and more efficient.

The touch listener 410 reads the coordinates determined by the touch detector and determines if the touch occurred in a touch area identified during calibration. The touch listener 410 determines the type of reaction or no reaction to take place based on the deployed data, the location of the touch and sometime the type of touch. In some cases, the touch listener 410 may facilitate a zoom in/out or a drag based on the determination of the type of touch. Touch listener may determine that there are no persons and/or no touch for a predetermined time or sense a person walk away and initiate a default display or a predetermined activity.

The analytics module 412 is designed to collect data and/or measure characteristics related to a predetermined object, person, movement, lack of movement, etc. for example, the analytics module 412 may identify a person, follow a path of a person, follow selections of a person, duration of a touch, lack of touch, list a person's activity, determine gender, personal characteristics, traffic, dwell time, etc.

Figure 5:
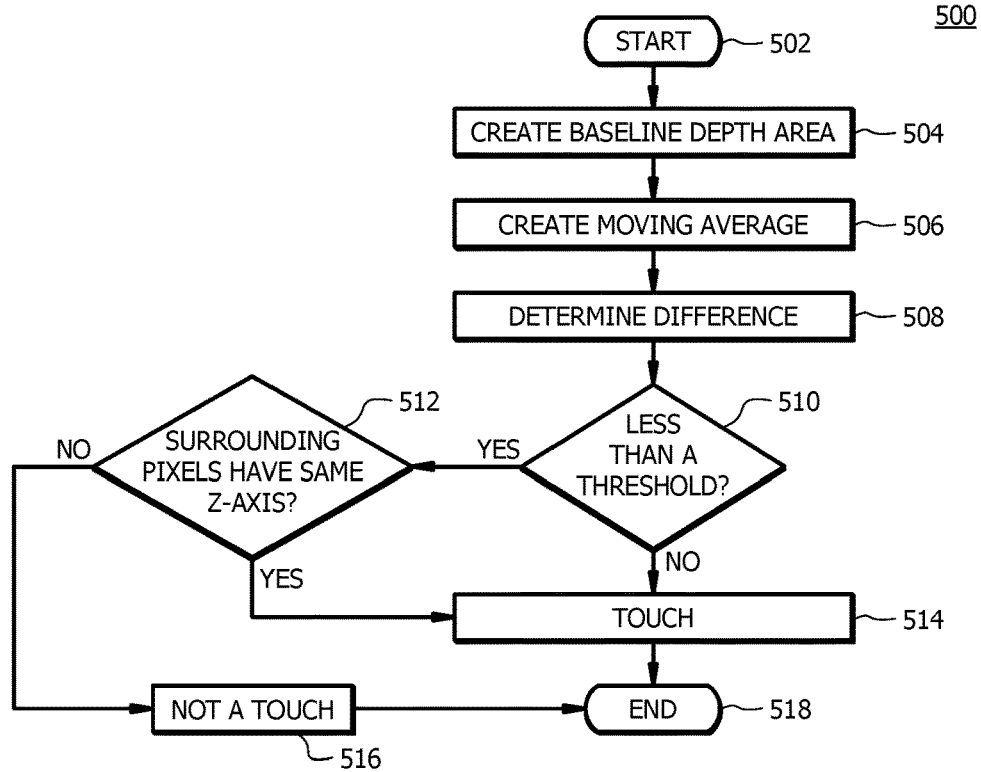
FIG. 5 is an embodiment illustrating a flow diagram of a method for refining touch recognition.

FIG. 5 is an embodiment illustrating a flow diagram of a method 500 for refining touch recognition. The method 500 starts at step 502 and proceeds to step 504. At step 504 the method 500 creates a baseline depth area using multi-frames from a depth camera. At step 506, the method 500 creates a moving average of a real-time area from the depth camera. At step 508, the method 500 determines the difference between the baseline and the moving average. At step 510, the method 500 determines if the difference is less than a pre-determined threshold. If it is less, then the method 500 proceeds to step 512 and looks at the surrounding pixels to determine if the event is a touch or noise. If the surrounding pixels have the same z-axis depth, the event is a touch, and the method 500 proceeds to step 514. In one embodiment, the radius of the surrounding pixels changes based on the depth of the camera. If the difference is greater than the threshold, then determine that the event is a touch, at step 514. If the surrounding pixels have different z-axis, then the method 500 proceeds to step 516. At step 516, the method 500 determines that the event is not a touch. From steps 514 and 516, the method 500 proceeds to step 518 where it ends.

Figure 6A:
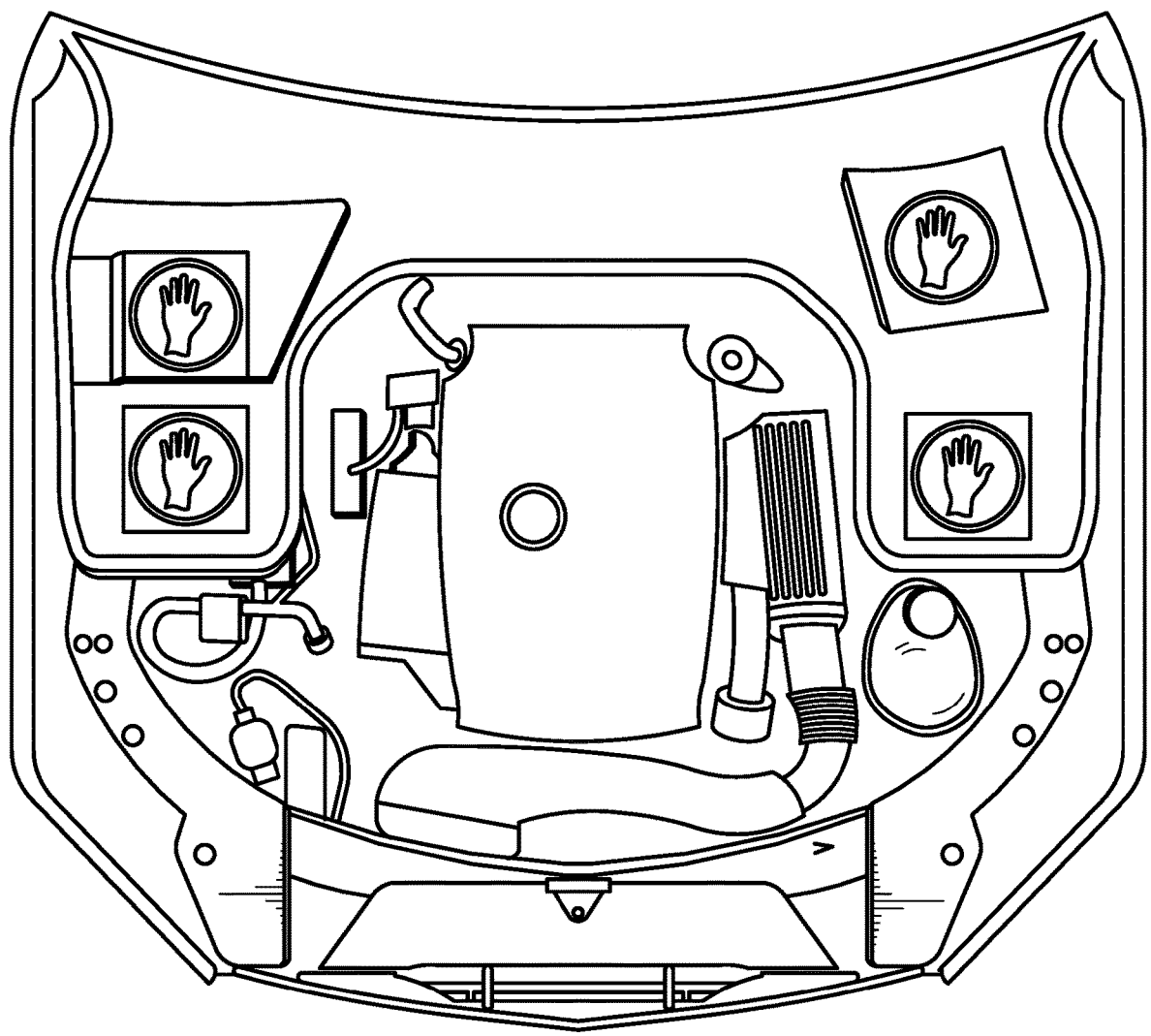
FIG. 6A-C are diagrams depicting an embodiment of an interactive container.
Figure 6B:
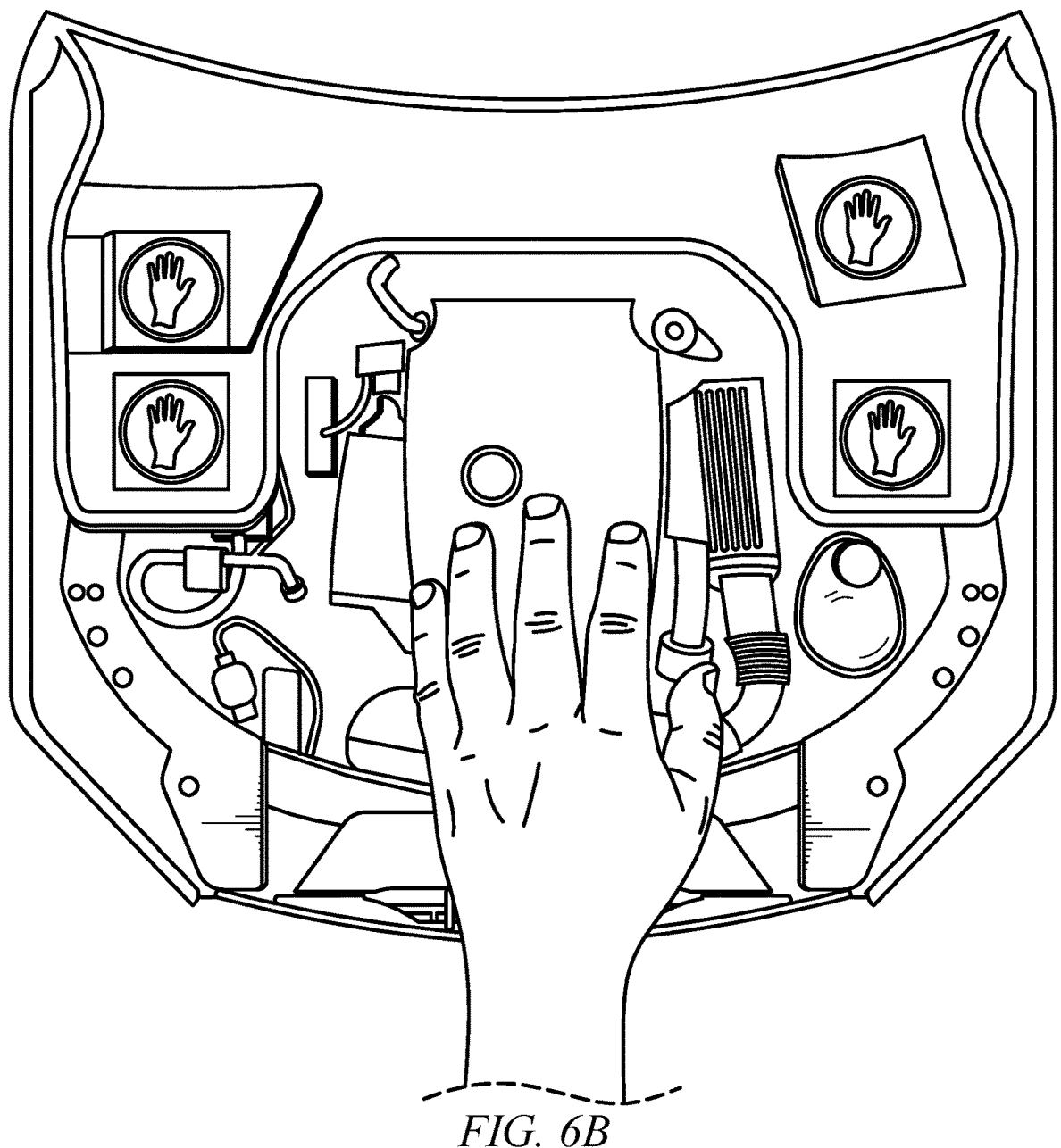
Figure 6C:
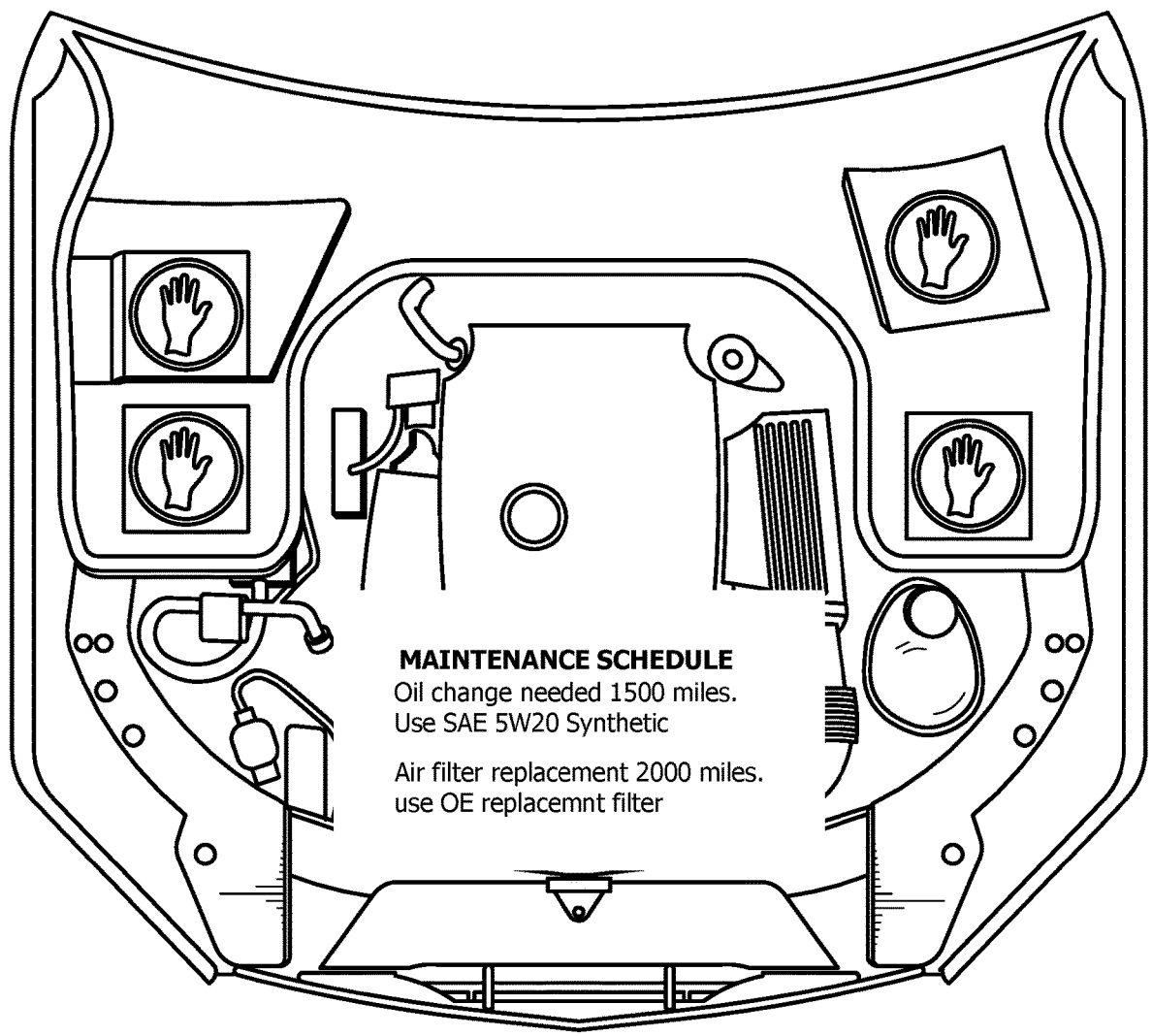

FIG. 6A-C are diagrams depicting an embodiment of an interactive container. In FIG. 6A, a container is shown that displays a car engine with its mechanics and electronics. In FIG. 6B, a touch is detected activating a touch area. In FIG. 6C, the touch results in the display of information related to the touch area. In other embodiments, such a touch may result in an engine sound, a menu display, a video activation etc.

It will be appreciated by those skilled in the art that changes could be made to the embodiments described above without departing from the broad inventive concept. It is understood, therefore, that this disclosure is not limited to the particular embodiments herein, but it is intended to cover modifications within the spirit and scope of the present disclosure as defined by the appended claims.

What is claimed is:

1. An interactive system comprising a processor capable of executing instruction relating to an interactive container creation method for creating an interactive experience, the interactive container creation method comprising:
   creating a list;
   deploying the list to at least one device;
   identifying at least one of an asset and a shape, in an image captured by a camera, to be defined as a touch area in a first interactive container,
      wherein the identifying comprises at least:
         retrieving a baseline depth area utilizing multiple depth frames;
         retrieving a moving average of a real-time area;
         determining a difference between the baseline depth area and the moving average;
         comparing the difference to a threshold and determining if the real-time area is to be defined as the touch area based on the comparison;
   identifying the x, y axis of at least one point of the at least one of asset or shape; and
   creating a correlation between (i) at least a portion of the list and (ii) the touch area, wherein the touch area of the first interactive container produces an activity, wherein the activity is identified in the list, and wherein the producing the activity results from interaction that is captured in the image from the camera and that is related to the touch area,
   wherein the produced activity is in a second interactive container relating to the projected image projected from the projector,
   wherein the projected image projected from the projector is viewable by the human eye without the need for wearable devices, and
   utilizing at least one of:
      (a) the camera to detect the interaction that is captured in the image from the camera and that is related to the touch area, and
      (b) the camera to detect an item in the image from the camera,
         wherein the detecting the item continues over a first time period,
         wherein a weighted average is used to add the detected item to the first interactive container over the first time period, and
   wherein, in response to the utilizing, the first interactive container:

(1) communicates with a second interactive container, and
(2) causes the producing the activity in the second interactive container.

2. The interactive container creation method of claim 1, wherein a radius of a surrounding pixels changes based on the depth of the camera.

3. The interactive container creation method of claim 1, wherein the list comprises at least one of an image, an asset, an attribute, a wisp, a rule, a menu, axis location and any combination thereof, wherein the attribute is at least one of audio, video, image, display, or combination thereof, and wherein the asset is at least one of an object, a person, printout of an object or person, a displayed item, an image, a video, an identified item or person, or a combination thereof.

4. The interactive container creation method of claim 1, wherein the list is deployed from a remote location.

5. The interactive container creation method of claim 1, wherein the list is deployed from a remote location via at least one of a network, a wireless network, and a cloud network.

6. The interactive container creation method of claim 1, wherein the list is created on a machine by identifying at least one of the asset and the shape.

7. The interactive container creation method of claim 1, wherein the list is deployed simultaneously on several devices in the same or in different locations.

8. The interactive container creation method of claim 1, wherein the list is manually deployed.

9. The interactive container creation method of claim 1 further comprising a calibration method, wherein the calibration method comprises:
    identifying an item to be defined as the touch area, wherein the item is one of the asset, a display, a shape, light, exposure, contrast, RGB difference, infrared, or a combination thereof;
    identifying coordinates of predetermined number of points related to the item; and
    identifying an area within the predetermined points as the touch area.

10. The interactive container creation method of claim 9, wherein the calibration method utilizes the camera to identify the coordinates.

11. The interactive container creation method of claim 9, wherein the calibration method is performed on a single container or multiple containers at the same time.

12. The interactive container creation method of claim 9, wherein the calibration method is one of automatic or manual.

13. The interactive container creation method of claim 9, wherein the calibration method further comprises identifying one of a rule, a menu, a display, and an activity related to the identified touch area.

14. The interactive container creation method of claim 9 further comprising at least one of:
    training an image to detect at least one of a known image, asset, logo, item or combination thereof;
    cropping calibration stream to calibrate only areas of interest.

* * * * *